(12) United States Patent
Choi et al.

(10) Patent No.: US 9,583,748 B2
(45) Date of Patent: Feb. 28, 2017

(54) BATTERY PACK HAVING TENSION BAR

(71) Applicant: LG CHEM, LTD., Seoul (KR)

(72) Inventors: Jong-Woon Choi, Daejeon (KR); Jeong-O Mun, Daejeon (KR); Dal-Mo Kang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/773,806

(22) PCT Filed: Apr. 1, 2015

(86) PCT No.: PCT/KR2015/003263
§ 371 (c)(1),
(2) Date: Sep. 9, 2015

(87) PCT Pub. No.: WO2015/152637
PCT Pub. Date: Oct. 8, 2015

(65) Prior Publication Data
US 2016/0133898 A1    May 12, 2016

(30) Foreign Application Priority Data
Apr. 3, 2014  (KR) ........................ 10-2014-0039961

(51) Int. Cl.
| | |
|---|---|
| *H01M 2/10* | (2006.01) |
| *H01M 10/04* | (2006.01) |
| *H01M 10/42* | (2006.01) |
| *H01M 2/20* | (2006.01) |
| *H01M 10/0525* | (2010.01) |
| *H01M 10/6555* | (2014.01) |
| *H01M 10/658* | (2014.01) |

(52) U.S. Cl.
CPC ....... *H01M 2/1077* (2013.01); *H01M 2/1061* (2013.01); *H01M 2/202* (2013.01); *H01M 2/206* (2013.01); *H01M 10/0481* (2013.01); *H01M 10/0525* (2013.01); *H01M 10/425* (2013.01); *H01M 10/658* (2015.04); *H01M 10/6555* (2015.04); *H01M 2220/20* (2013.01)

(58) Field of Classification Search
CPC ............. H01M 2/1077; H01M 2/1061; H01M 10/6555; H01M 2/202; H01M 10/658; H01M 10/0525; H01M 2/206; H01M 10/425; H01M 10/0481
See application file for complete search history.

(56) References Cited

U.S. PATENT DOCUMENTS

| | | | |
|---|---|---|---|
| 6,275,003 | B1 | 8/2001 | Marukawa et al. |
| 9,472,797 | B2 | 10/2016 | Han et al. |
| 2003/0099885 | A1 | 5/2003 | Kim et al. |
| 2012/0115016 | A1 | 5/2012 | Kim |
| 2012/0214046 | A1 | 8/2012 | Lim |
| 2013/0040180 | A1 | 2/2013 | Lim |

(Continued)

FOREIGN PATENT DOCUMENTS

| | | |
|---|---|---|
| CN | 1277462 A | 12/2000 |
| CN | 102881846 A | 1/2013 |

(Continued)

*Primary Examiner* — Stewart Fraser
(74) *Attorney, Agent, or Firm* — Birch, Stewart, Kolasch & Birch, LLP

(57) ABSTRACT

Disclosed is a battery pack which improves coupling strength and space utilization of a plurality of battery modules.

15 Claims, 13 Drawing Sheets

(56) References Cited

U.S. PATENT DOCUMENTS

| | | | |
|---|---|---|---|
| 2013/0183571 A1 | 7/2013 | Miyazaki et al. | |
| 2013/0273404 A1* | 10/2013 | Ochi | H01M 2/14 429/99 |
| 2013/0330584 A1 | 12/2013 | Lee et al. | |
| 2014/0023906 A1* | 1/2014 | Hashimoto | H01M 2/1077 429/120 |
| 2014/0113171 A1* | 4/2014 | Schaefer | H01M 2/1077 429/120 |
| 2014/0134462 A1 | 5/2014 | Choi et al. | |
| 2016/0141712 A1* | 5/2016 | Choi | H01M 2/1016 320/109 |
| 2016/0336563 A1* | 11/2016 | Choi | H01M 2/1016 |

FOREIGN PATENT DOCUMENTS

| | | |
|---|---|---|
| CN | 103492892 A | 1/2014 |
| EP | 1 852 925 A1 | 11/2007 |
| EP | 2 658 008 A1 | 10/2013 |
| JP | 2012-174693 A | 9/2012 |
| KR | 10-2002-0065293 A | 8/2002 |
| KR | 10-0765659 B1 | 10/2007 |
| KR | 10-2012-0132338 A | 12/2012 |
| KR | 10-2013-0017289 A | 2/2013 |
| KR | 10-2014-0000770 A | 1/2014 |
| WO | WO 2012/043594 A1 | 4/2012 |
| WO | WO 2013/019008 A2 | 2/2013 |

\* cited by examiner

P-type

S-type (A)

(B)

(C)

(D)

100

BATTERY PACK HAVING TENSION BAR

TECHNICAL FIELD

The present disclosure relates to a battery pack, and more particularly, to a battery pack for improving coupling strength and space utilization of a plurality of battery modules.

The present application claims priority to Korean Patent Application No. 10-20140039961 filed on Apr. 3, 2014 in the Republic of Korea, the disclosures of which are incorporated herein by reference.

BACKGROUND ART

A secondary battery having good application to various product groups and good electric characteristics such as high energy density is widely applied to not only portable devices but also an electric vehicle (EV) or a hybrid electric vehicle (HEV) driven by an electric driving source. The secondary battery has a primary advantage of greatly reducing the use of fossil fuels and a secondary advantage of generating no byproduct in use of energy, and thus attracts attention as a new energy source for enhancing environment-friendly and energy-efficient properties.

Lithium ion batteries, lithium polymer batteries, nickel cadmium batteries, nickel hydrogen batteries, nickel zinc batteries or the like are widely used as secondary batteries at the present. Such a unit secondary battery cell has an operating voltage of about 2.5V to 4.2V. Therefore, if a higher output voltage is demanded, a plurality of secondary battery cells may be connected in series to configure a battery pack. In addition, according to a charge/discharge capacity demanded to the battery pack, a plurality of secondary battery cells may also be connected in parallel to configure a battery pack. Therefore, the number of secondary battery cells included in the battery pack may be various set depending on a demanded output voltage or charge/discharge capacity.

Meanwhile, if a plurality of secondary battery cells is connected in series or in parallel to configure a battery pack, in general cases, two or more secondary battery cells are assembled to configure a battery module, a plurality of battery modules is assembled to configure a battery module assembly, and other components are added to the battery module assembly, thereby configuring a battery pack. At this time, the shape of the battery module assembly is determined depending on electric connection or mechanical connection among the plurality of battery modules.

FIG. 1 shows an example of an existing battery module assembly.

The battery module assembly 1 depicted in FIG. 1 is disclosed in Korean Unexamined Patent Publication No. 10-2013-0017289, and this document discloses that a coupling force is obtained using a bolt 2 in order to obtain a mechanical connection between battery modules 3. However, if the battery modules 3 are coupled using the bolt 2, a hole should be separately formed in a battery module frame for the bolt coupling. In addition, when battery modules are coupled using the bolt 2, a sufficient space capable of supporting the bolt 2 is required around the hole for the bolt coupling in order to give mechanical strength. Therefore, the above technique, in which a hole is directly formed in the battery module frame and the bolt 2 is coupled to the hole, has disadvantage in terms of space utilization.

DISCLOSURE

Technical Problem

The present disclosure is designed to solve the problems of the related art, and therefore the present disclosure is directed to providing a battery pack, which may improve coupling strength and space utilization of a plurality of battery modules.

Technical Solution

In one aspect of the present disclosure, there is provided a battery pack, which includes a plurality of battery modules, each having two secondary battery cells, a module frame and a cooling fin; end plates provided at both sides of a battery module assembly configured by assembling the plurality of battery modules; a front circuit assembly electrically connected to electrode leads formed at the plurality of battery modules included in the battery module assembly; a rear circuit assembly electrically connected to electrode leads formed at the plurality of battery modules included in the battery module assembly; a tension bar configured to fix the end plates by using protrusions formed at the end plates; a front cover configured to cover front portions of the front circuit assembly and the battery module assembly not to be exposed outwards; and a rear cover configured to cover rear portions of the rear circuit assembly and the battery module assembly not to be exposed outwards.

According to an embodiment of the present disclosure, the battery module may be any one of a parallel-type module in which electrode leads having the same polarity formed at two secondary battery cells are exposed in the same direction and a series-type module in which electrode leads having the same polarity formed at two secondary battery cells are exposed in different directions, and the battery module assembly may include the parallel-type module and the series-type module simultaneously. At this time, the battery module assembly may include six battery modules. In addition, the battery module assembly may include four parallel-type modules and two series-type modules. The battery modules may be arranged from one side to the other side in the order of a parallel-type module, a series-type module, a parallel-type module, a parallel-type module, a series-type module and a parallel-type module.

Meanwhile, the front circuit assembly and the rear circuit assembly may be configured to electrically connect three secondary battery cells in parallel and electrically connect four unit sets, in which the three secondary battery cells are electrically connected in parallel, in series.

According to an embodiment of the present disclosure, the battery module assembly may include an absorption pad respectively interposed between the battery modules. Preferably, the absorption pad may be made of ethylene propylene diene monomer (EPDM) rubber.

According to an embodiment of the present disclosure, the battery pack may further include an insulation sheet interposed between the battery module assembly and the end plate.

The front circuit assembly according to the present disclosure may include a connector for coupling with an external measurement device.

According to an embodiment of the present disclosure, a thread may be formed at the protrusion formed on the end plate, a groove corresponding to the protrusion may be formed at the tension bar, and the end plate and the tension bar may be fixed using a nut.

According to an embodiment of the present disclosure, the tension bar may be respectively connected to a front upper portion, a front lower portion, a rear upper portion and a rear lower portion of the battery module assembly.

According to an embodiment of the present disclosure, the front cover may include an electrode terminal electrically connected to the front circuit assembly, and the electrode terminal may be exposed at an outer surface of the front cover.

The battery pack according to the present disclosure may serve as a component of a battery operating system, which includes a battery pack; and a load configured to receive power from the battery pack. At this time, the load may be an electric-driven unit or a portable device.

Advantageous Effects

According to the present disclosure, since a tension bar is used, it is not needed to form a hole in a battery module frame for bolt coupling, different from existing cases. Therefore, according to the present disclosure, the space occupied by the battery module frame in a battery pack may be reduced. Thus, the volume occupied by a secondary battery cell per unit volume of a battery pack may be increased, which may improve energy density of the battery pack. In other words, according to the present disclosure, charging/discharging capacity of the battery pack may be increased, or the volume of the battery pack may be decreased.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings. In the drawings.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the spirit and scope of the disclosure.

Figure 2:
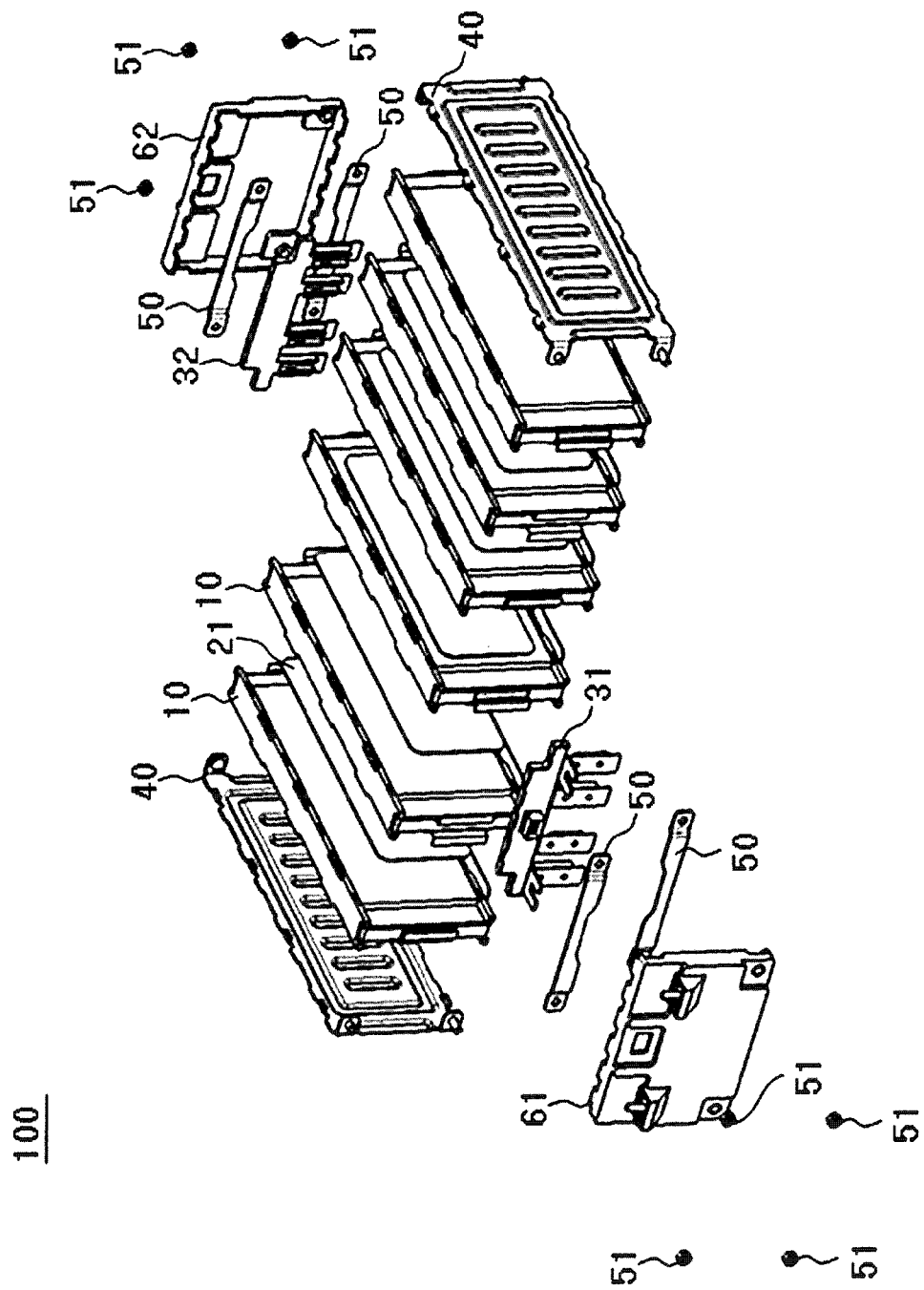
FIG. 2 is an exploded perspective view showing a battery pack according to an embodiment of the present disclosure.

FIG. 2 is an exploded perspective view showing a battery pack according to an embodiment of the present disclosure.

Referring to FIG. 2, a battery pack 100 according to an embodiment of the present disclosure includes a battery module 10, two end plates 40, a front circuit assembly 31, a rear circuit assembly 32, a tension bar 50, a front cover 61 and a rear cover 62. Hereinafter, the battery pack according to an embodiment of the present disclosure will be described according to an assembling process of the battery pack.

Figure 3:
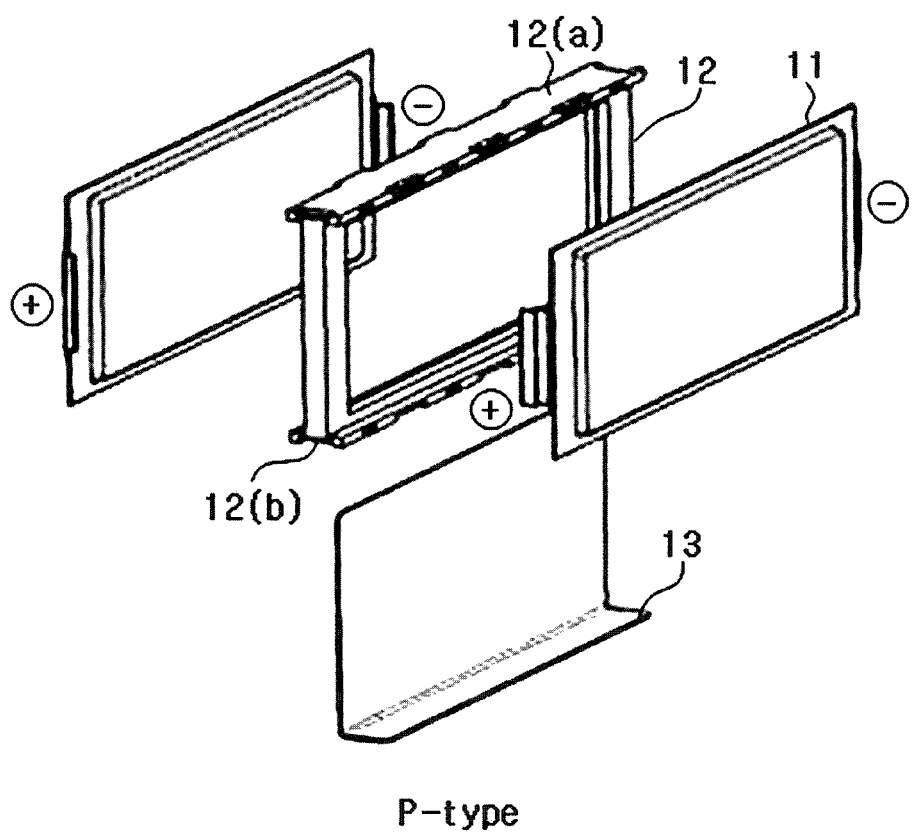
FIGS. 3 and 4 are exploded perspective views showing a battery module according to an embodiment of the present disclosure.
Figure 4:
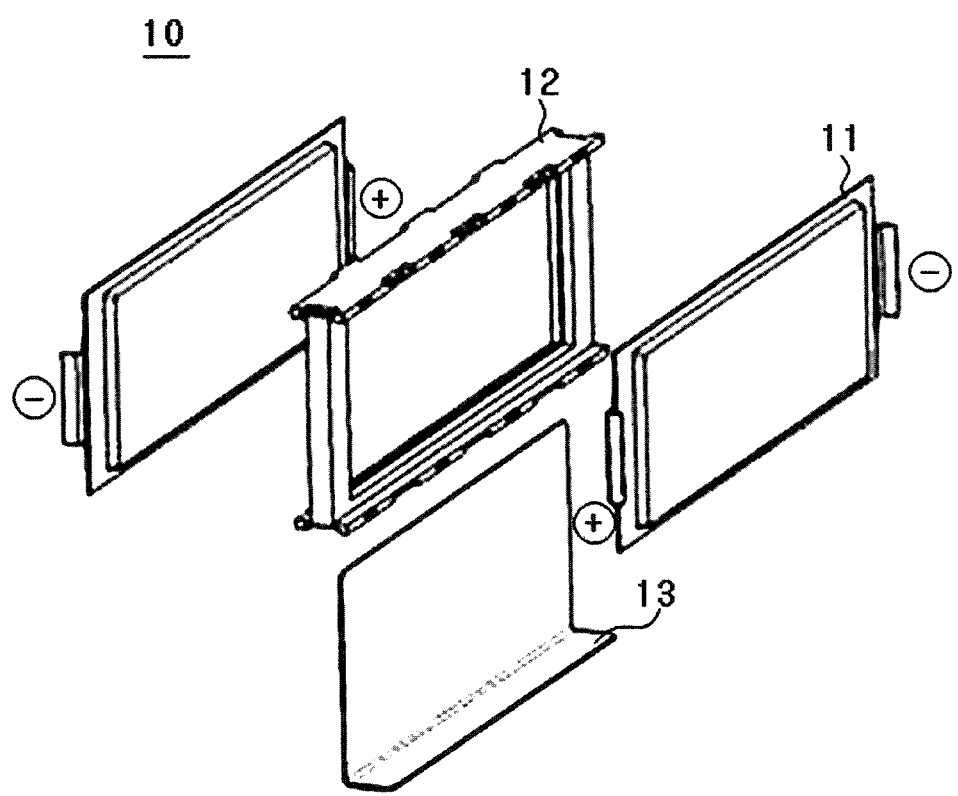

FIGS. 3 and 4 are exploded perspective views showing a battery module according to an embodiment of the present disclosure.

Referring to FIG. 3, the battery module 10 according to an embodiment of the present disclosure includes two secondary battery cells 11, a module frame 12 and a cooling fin 13.

The secondary battery cell 11 is not specially limited in its kind. Each secondary battery cell 11 may be a lithium ion battery, a lithium polymer battery, a nickel cadmium battery, a nickel hydrogen battery, a nickel zinc battery or the like, which are rechargeable and have appropriate charging and discharging voltages. Preferably, the secondary battery cell 11 may be a lithium polymer battery. In addition, the secondary battery cell 11 may be classified into pouch-type, cylindrical-type, rectangular-type or the like. Preferably, the secondary battery cell 11 may be a pouch-type secondary battery cell.

The module frame 12 is shaped so that the secondary battery cells 11 may be fixed to both sides thereof. In addition, a top surface 12a and a bottom surface 12b of the module frame 12 become a top surface and a bottom surface of the battery pack, which are exposed outwards when the battery pack is configured, and thus may have a flat shape. In addition, the module frame 12 may be shaped to be fixed with an adjacent module frame by engagement. In addition, a slit may be formed at the bottom surface 12b of the module frame 12 so that the cooling fin 13 may be inserted therein. In addition, the module frame 12 may have a center opened in a side direction so that the cooling fin 13 may come into contact with the secondary battery cell 11.

The module frame 12 may be made of polymer material. Preferably the module frame 12 is made of PA66.

The cooling fin 13 plays a role of emitting heat of the secondary battery cell 11 by means of indirect cooling. Even though FIG. 3 shows that the cooling fin has an 'L' shape, the cooling fin may also have a 'T' shape or an 'I' shape. The cooling fin 13 may be made of metal. Preferably, the cooling fin 13 may be made of aluminum.

The battery module 10 may be classified into two types. One type is a parallel-type (P-type) module in which electrode leads having the same polarity formed at two secondary battery cells 11 are exposed in the same direction. The other type is a series-type (S-type) module in which electrode leads having the same polarity formed at two secondary battery cells 11 are exposed in different directions. The battery module 10 depicted in FIG. 3 is a P-type module, and the battery module 10 depicted in FIG. 4 is an S-type module.

A battery module assembly 20 is configured by assembling a plurality of battery modules 10. The battery module assembly 20 according to the present disclosure may include the parallel-type module and the series-type module simultaneously.

Figure 5:
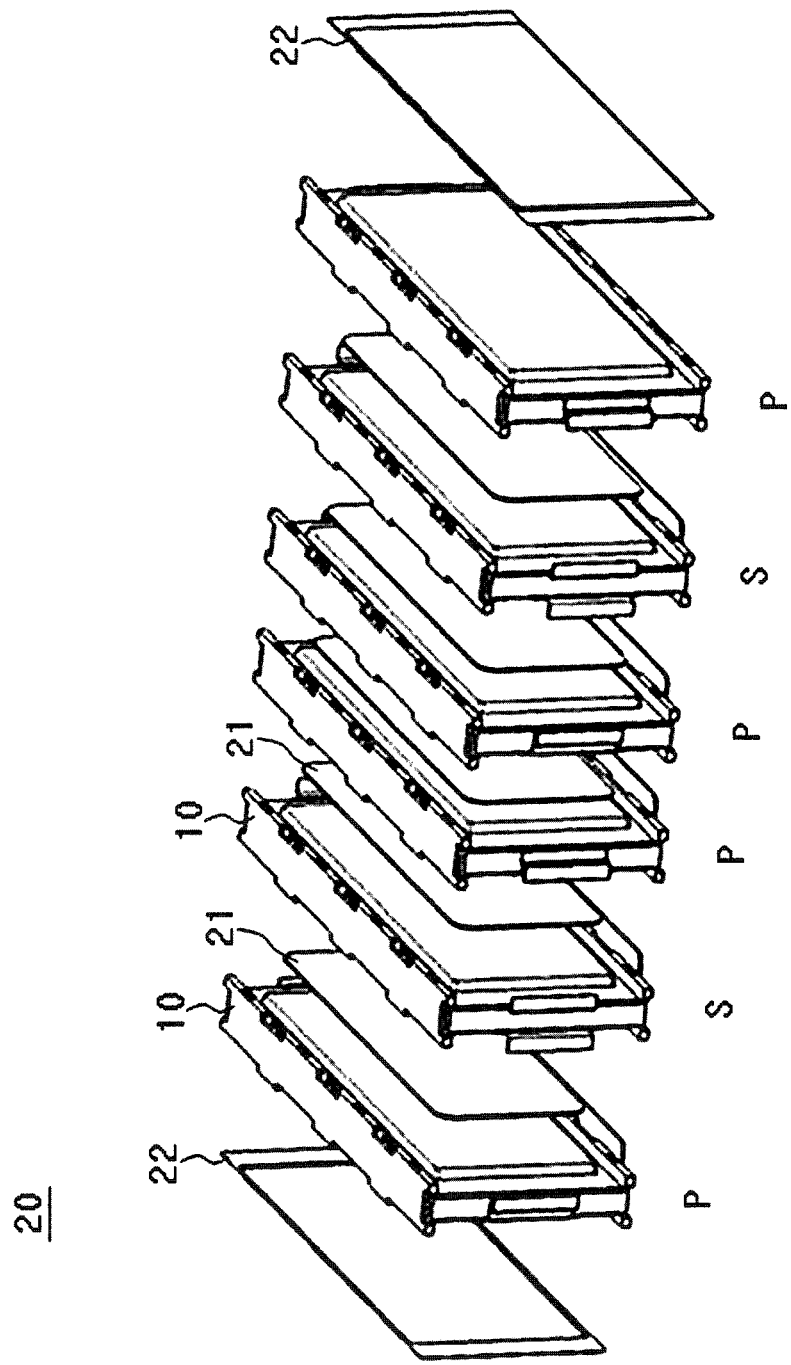
FIG. 5 is an exploded perspective view showing a battery module assembly according to an embodiment of the present disclosure.

FIG. 5 is an exploded perspective view showing a battery module assembly according to an embodiment of the present disclosure.

According to an embodiment of the present disclosure, the battery module assembly 20 includes six battery modules 10. At this time, the battery module assembly 20 may include four parallel-type modules and two series-type modules. In addition, in the battery module assembly 20, the battery modules may be arranged from one side to the other side in the order of a P-type module, a S-type module, a P-type module, a P-type module, a S-type module and a P-type module. This arrangement order will be described later in more detail.

According to an embodiment of the present disclosure, the battery module assembly 20 may include an absorption pad 21. The absorption pad 21 may be respectively interposed between the battery modules 10. In more detail, the absorption pad 21 may be interposed between two adjacent battery modules. The absorption pad 21 prevents collision of adjacent secondary battery cells 11, absorbs external impacts and prevents heat transfer. The absorption pad 21 may be made of polymer material. Preferably, the absorption pad 21 may be made of ethylene propylene diene monomer (EPDM) rubber.

Figure 1:
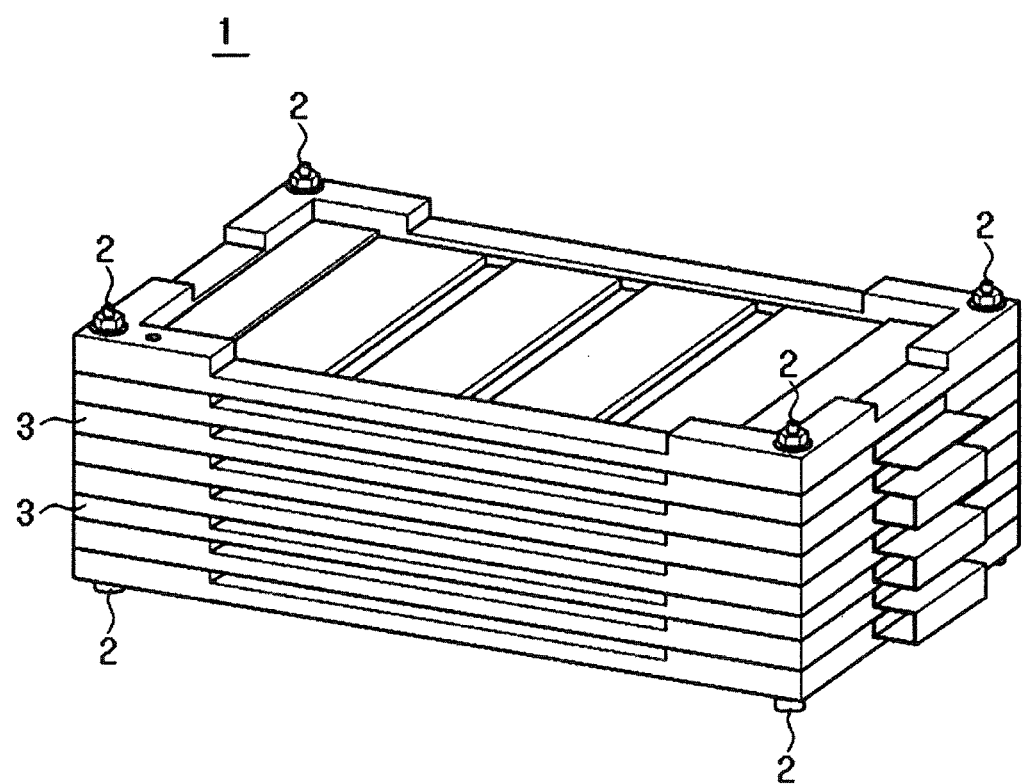
FIG. 1 shows an example of an existing battery module assembly.

According to an embodiment of the present disclosure, the battery pack may further include an insulation sheet 22. The insulation sheet 22 may be interposed between the battery module assembly 20 and the two end plates 40. An interposed location of the insulation sheet 22 is depicted in FIGS. 1 and 5.

Figure 6:
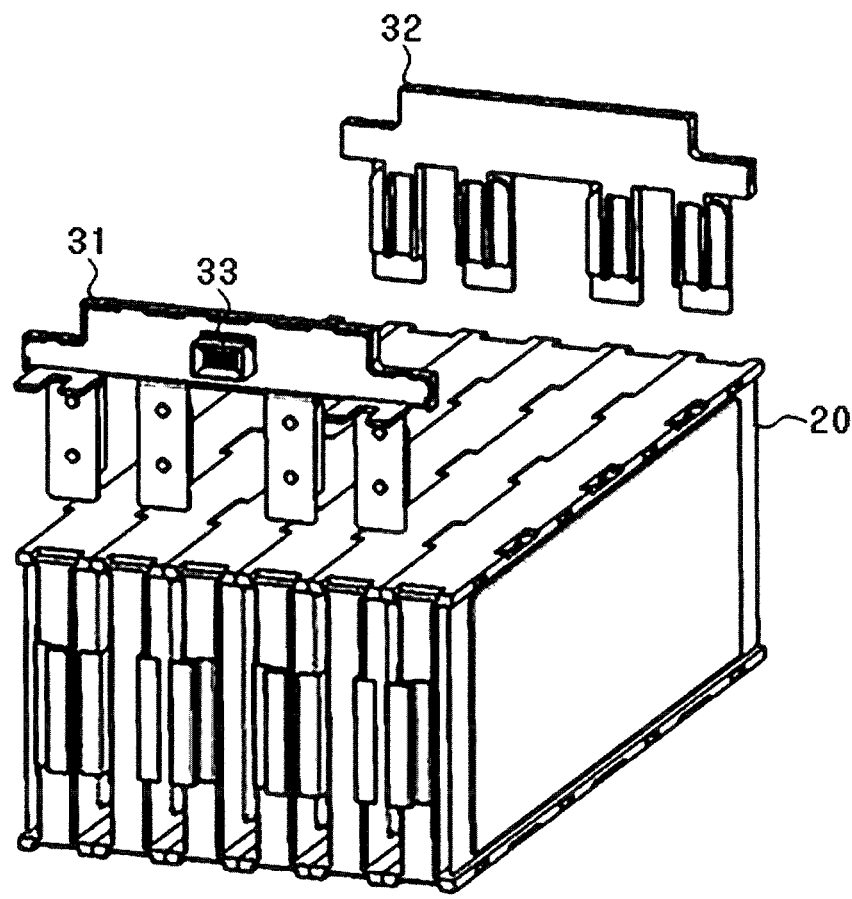
FIGS. 6 and 7 are diagrams showing a connection structure of a front circuit assembly and a rear circuit assembly.
Figure 7:
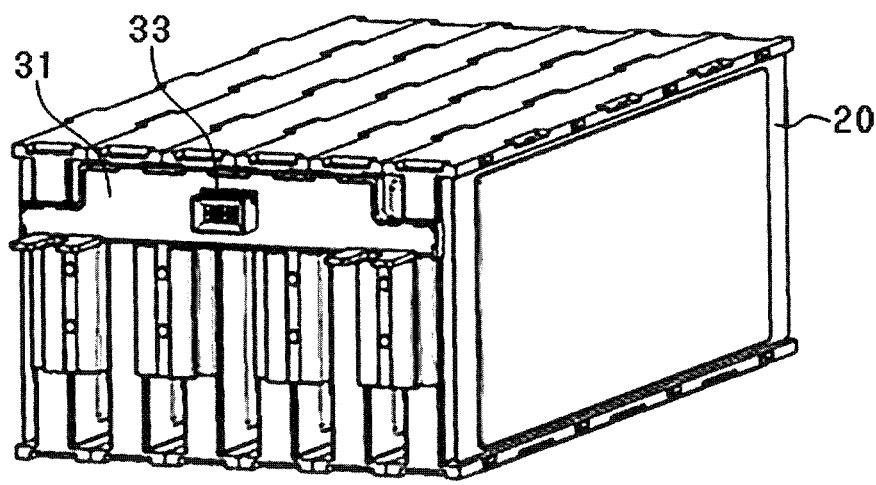

FIGS. 6 and 7 are diagrams showing a connection structure of a front circuit assembly and a rear circuit assembly.

Referring to FIGS. 6 and 7, it may be understood how the front circuit assembly 31 and the rear circuit assembly 32 are connected.

The front circuit assembly 31 and the rear circuit assembly 32 are electrically connected to electrode leads formed at the plurality of battery modules 10 included in the battery module assembly 20. The front circuit assembly 31 and the rear circuit assembly 32 include a terminal bus bar and an inter bus bar, and thus may be connected to electrode leads formed at the plurality of battery modules 10 by means of welding (see the lightning sign in FIGS. 9 to 12).

The front circuit assembly 31 may include a connector 33 which allows a connection to an external measurement device. For example, the external measurement device may be a device for measuring voltages of the secondary battery cells 11.

According to an embodiment of the present disclosure, the front circuit assembly 31 and the rear circuit assembly 32 may be configured to electrically connect three secondary battery cells in parallel and electrically connect four unit sets, in which the three secondary battery cells are electrically connected in parallel, in series. The electric connection structure formed by the front circuit assembly 31 and the rear circuit assembly 32 may be called a 3P4S structure.

FIGS. 8 to 12 are diagrams for illustrating a 3P4S structure of a battery pack according to an embodiment of the present disclosure.

Figure 8:
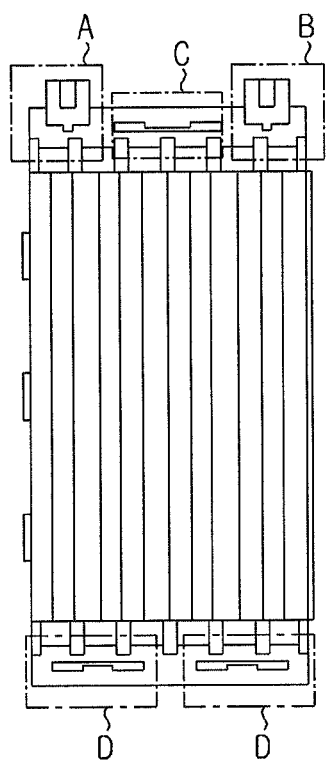
FIGS. 8 to 12 are diagrams for illustrating a 3P4S structure of a battery pack according to an embodiment of the present disclosure.
Figure 9:
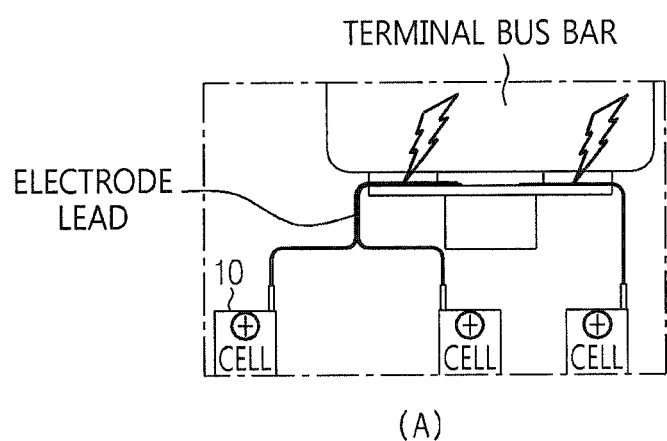
Figure 10:
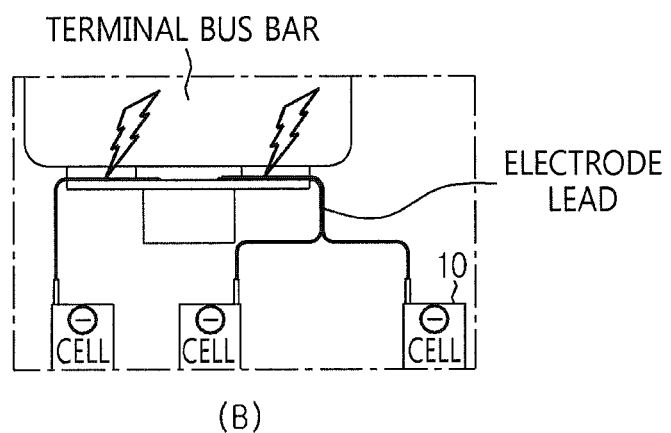
Figure 11:
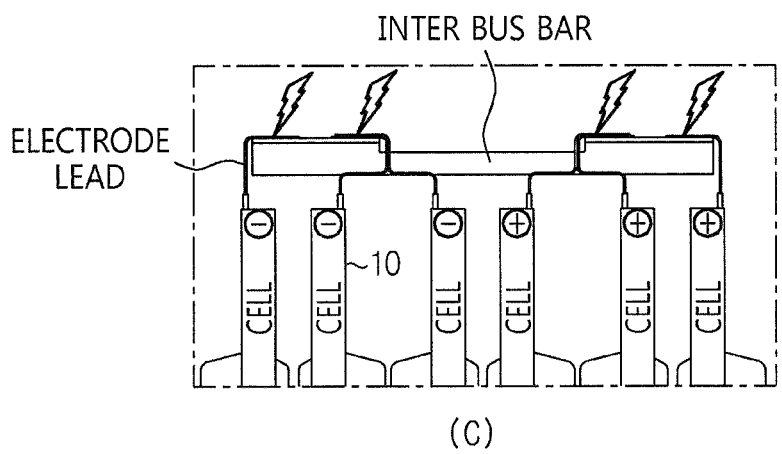
Figure 12:
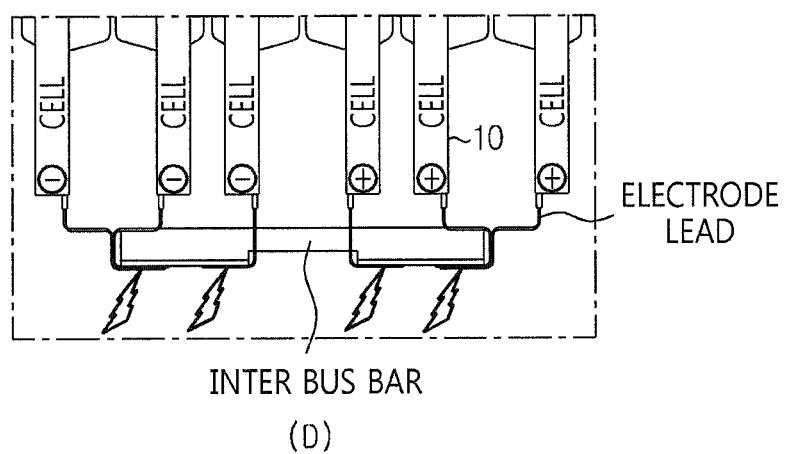

FIG. 8 is a plane view showing the battery module assembly 20. In this plane view, A, B, C and D are marked as reference symbols for classifying portions of the battery module assembly 20. FIG. 9 is an enlarged view showing the portion A of FIG. 8. FIG. 10 is an enlarged view showing the portion B of FIG. 8. FIG. 11 is an enlarged view showing the portion C of FIG. 8. FIG. 12 is an enlarged view showing the portion D of FIG. 8. Referring to FIGS. 8 to 12, the electric connection structure of the 1 two secondary battery cells 11 may be understood.

Figure 13:
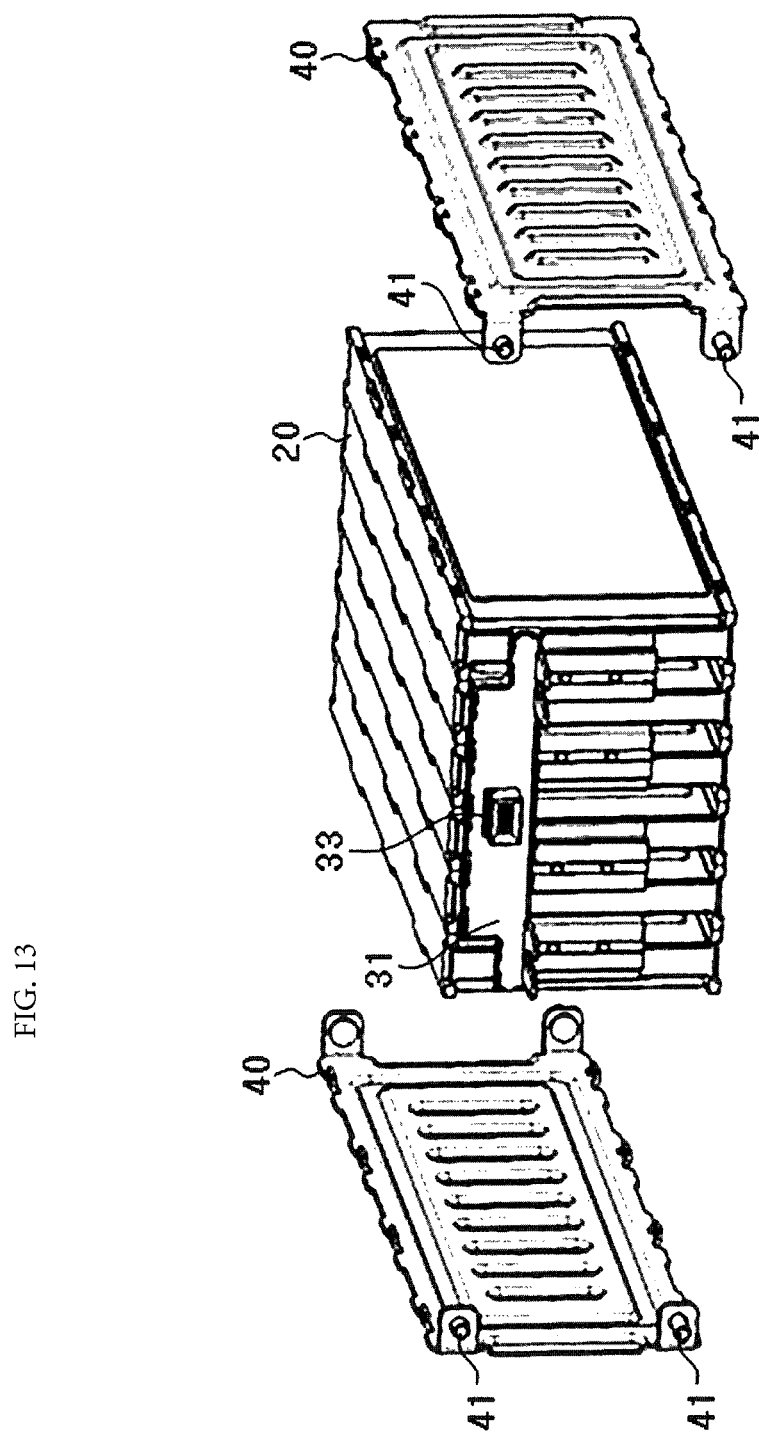
FIG. 13 is a diagram for illustrating a connection location of an end plate according to an embodiment of the present disclosure.

FIG. 13 is a diagram for illustrating a connection location of an end plate according to an embodiment of the present disclosure.

Referring to FIG. 13, the two end plates 40 are located at both sides of the battery module assembly 20. In addition, protrusions 41 are formed at the end plates 40. In FIG. 13, the protrusion 41 is formed to vertically protrude on an extension of the end plate 40 which is bent. The tension bar 50 fixes the two end plates 40 by using the protrusion 41.

Figure 14:
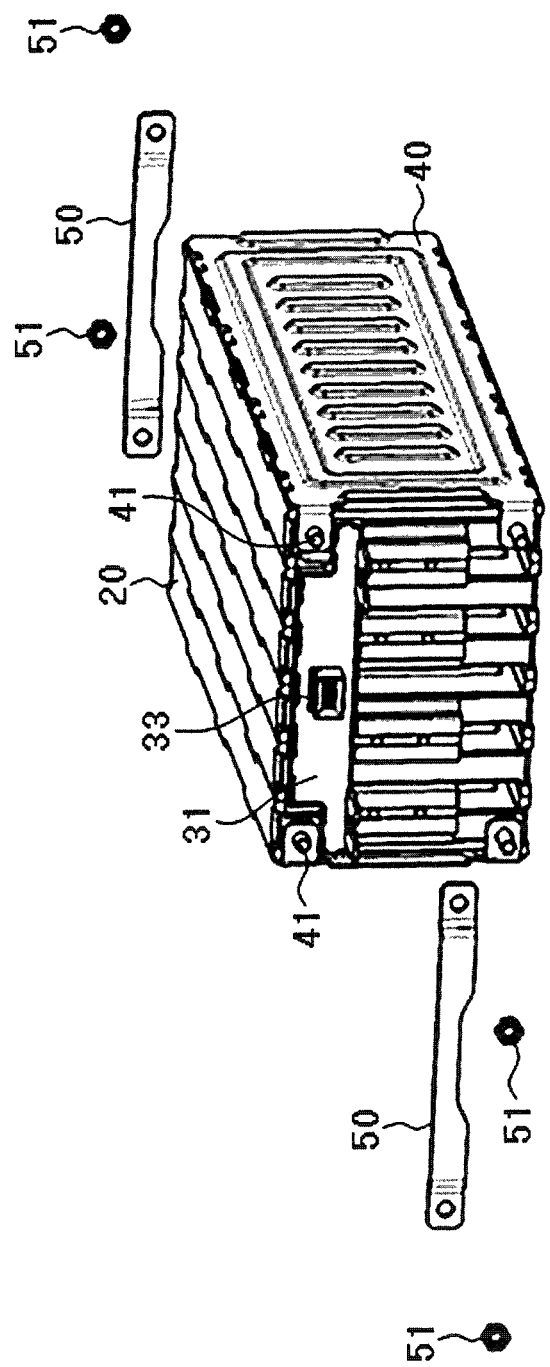
FIG. 14 is a fixing method of a tension bar according to an embodiment of the present disclosure.

FIG. 14 is a fixing method of a tension bar according to an embodiment of the present disclosure.

Referring to FIG. 14, it may be understood that the two end plates 40 are firmly fixed by means of the tension bar 50. When the tension bar 50 is used, different from the existing technique, it is not needed to form a separate hole in the battery module frame for bolt coupling. Therefore, a space occupied by the battery module frame in the battery pack may be reduced. As a result, assuming that the battery pack has a fixed volume, if the volume of the secondary battery cell may be increased, and further charging/discharging capacity of the battery pack may be increased. In addition, assuming that the battery pack has a fixed charging/discharging capacity, the battery pack may be designed to have a smaller volume.

According to an embodiment of the present disclosure, a thread may be formed at an outer circumference of the protrusion 41 formed at the end plate 40. In addition, a groove corresponding to the protrusion 41 may be formed at the tension bar 50. Therefore, the protrusion 41 of the end plate 40 may be inverted into the groove of the tension bar 50 and then fixed thereto by means of a nut 51. In other words, the end plate 40 and the tension bar 50 may be fixed using the nut 51.

According to an embodiment of the present disclosure, the tension bar 50 may be connected to a front upper portion, a front lower portion, a rear upper portion and a rear lower portion of the battery module assembly 20.

Figure 15:
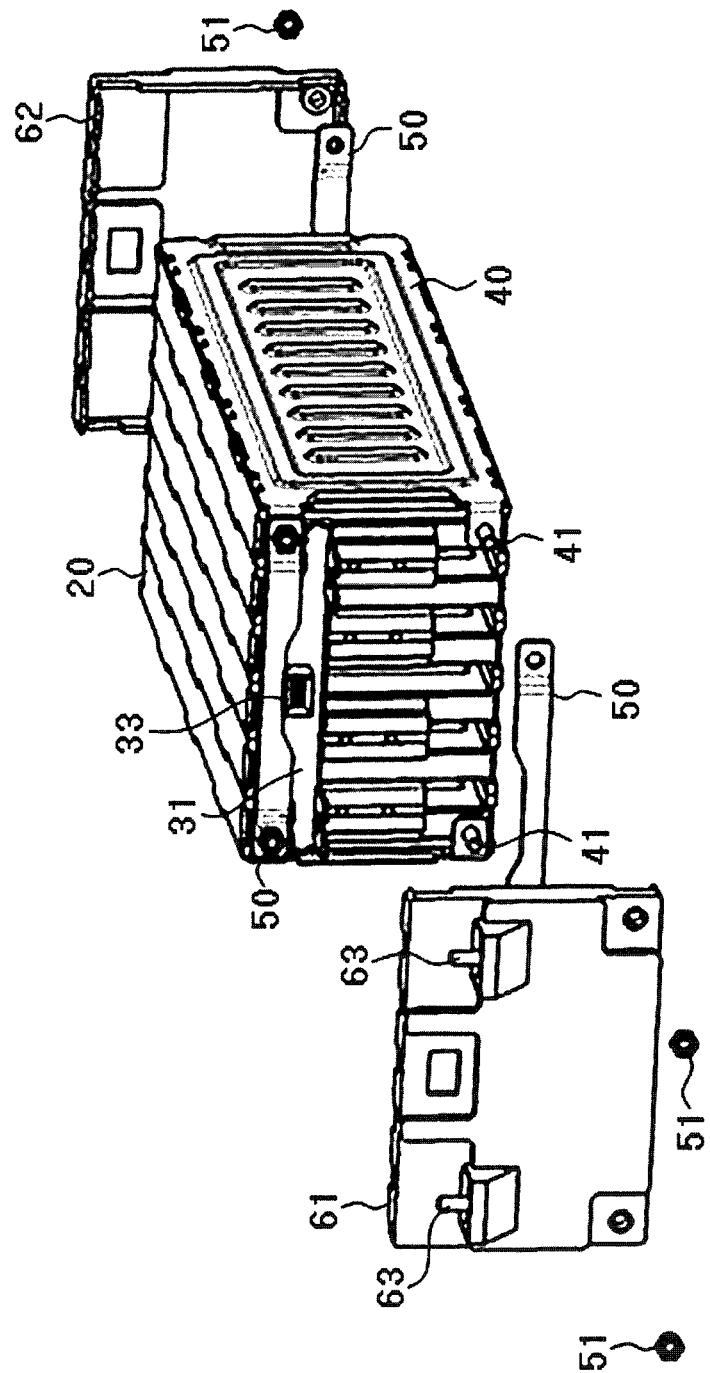
FIG. 15 is a diagram for illustrating a connection location of a front cover and a rear cover.

FIG. 15 is a diagram for illustrating a connection location of a front cover and a rear cover.

Referring to FIG. 15, the front cover 61 plays a role of covering front portions of the front circuit assembly 31 and the battery module assembly 20 not to be exposed outwards. In other words, the front cover is disposed at and coupled to the front portions of the front circuit assembly and the battery module assembly to cover the front portions of the front circuit assembly and the battery module assembly. Similarly, the rear cover 62 plays a role of covering rear portions of the rear circuit assembly 32 and the battery module assembly 20 not to be exposed outwards. In other words, the rear cover is disposed at and coupled to the rear portions of the rear circuit assembly and the battery module assembly to cover the rear portions of the rear circuit assembly and the battery module assembly.

According to an embodiment of the present disclosure, the front cover 61 includes an electrode terminal 63 electrically connected to the front circuit assembly 31. The electrode terminal 63 is exposed at an outer surface of the front cover 61. The battery pack 100 supplies power or receives a charging power through the electrode terminal 63.

Figure 16:
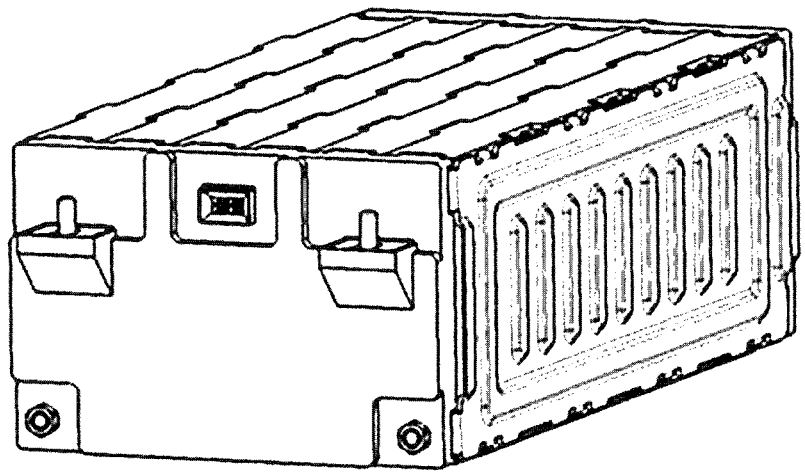
FIG. 16 is a perspective view showing a battery pack according to an embodiment of the present disclosure in an assembled state.

FIG. 16 is a perspective view showing a battery pack according to an embodiment of the present disclosure in an assembled state.

The battery pack 100 according to the present disclosure may serve as a component of a battery operating system including a battery pack 100 and a load supplied with power from the battery pack 100. For example, the battery operating system may be an electric vehicle (EV), a hybrid electric vehicle (HEV), an electric bicycle (E-Bike), a power tool, an energy storage system, an uninterrupted power supply (UPS), a portable computer, a portable phone, a portable audio device, a portable video device or the like, and the load may be a motor for providing a rotating force with power supplied from the battery pack or a power conversion circuit for converting the power supplied by the battery pack into a power required for various circuit components.

In addition, even though it has been described that an additional component is provided solely for convenient explanation, two or more additional components may also be provided in combination. Therefore, the present disclosure is not limited to the above embodiments.

The present disclosure has been described in detail. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

What is claimed is:

1. A battery pack, comprising:
   a plurality of battery modules, each having two secondary battery cells, a module frame and a cooling fin;
   end plates provided at both sides of a battery module assembly configured by assembling the plurality of battery modules;
   a front circuit assembly electrically connected to electrode leads formed at the plurality of battery modules included in the battery module assembly;
   a rear circuit assembly electrically connected to electrode leads formed at the plurality of battery modules included in the battery module assembly;
   a tension bar configured to fix the end plates by using protrusions formed at the end plates;
   a front cover configured to cover front portions of the front circuit assembly and the battery module assembly not to be exposed outwards; and
   a rear cover configured to cover rear portions of the rear circuit assembly and the battery module assembly not to be exposed outwards.

2. The battery pack according to claim 1,
   wherein the battery module is any one of a parallel-type module in which electrode leads having the same polarity formed at two secondary battery cells are exposed in the same direction and a series-type module in which electrode leads having the same polarity formed at two secondary battery cells are exposed in different directions, and
   wherein the battery module assembly includes the parallel-type module and the series-type module simultaneously.

3. The battery pack according to claim 2,
   wherein the battery module assembly includes six battery modules.

4. The battery pack according to claim 3,
   wherein the battery module assembly includes four parallel-type modules and two series-type modules.

5. The battery pack according to claim 4,
   wherein the battery modules are arranged from one side to the other side in the order of a parallel-type module, a series-type module, a parallel-type module, a parallel-type module, a series-type module and a parallel-type module.

6. The battery pack according to claim 5,
   wherein the front circuit assembly and the rear circuit assembly are configured to electrically connect three secondary battery cells in parallel and electrically connect four unit sets, in which the three secondary battery cells are electrically connected in parallel, in series.

7. The battery pack according to claim 1,
   wherein the battery module assembly includes an absorption pad respectively interposed between the battery modules.

8. The battery pack according to claim 7,
   wherein the absorption pad is made of ethylene propylene diene monomer (EPDM) rubber.

9. The battery pack according to claim 1,
   wherein the battery pack further includes an insulation sheet interposed between the battery module assembly and the end plate.

10. The battery pack according to claim 1,
    wherein the front circuit assembly includes a connector for coupling with an external measurement device.

11. The battery pack according to claim 1,
    wherein a thread is formed at the protrusion formed on the end plate,
    wherein a groove corresponding to the protrusion is formed at the tension bar, and
    wherein the end plate and the tension bar are fixed using a nut.

12. The battery pack according to claim 1,
    wherein the tension bar is respectively connected to a front upper portion, a front lower portion, a rear upper portion and a rear lower portion of the battery module assembly.

13. The battery pack according to claim 1,
    wherein the front cover includes an electrode terminal electrically connected to the front circuit assembly, and
    wherein the electrode terminal is exposed at an outer surface of the front cover.

14. A battery operating system, comprising:
    a battery pack defined in claim 1; and
    a load configured to receive power from the battery pack.

15. The battery operating system according to claim 14,
    wherein the load is an electric-driven unit or a portable device.

* * * * *